(12) United States Patent
Smith

(10) Patent No.: US 8,585,342 B2
(45) Date of Patent: Nov. 19, 2013

(54) HAY BALE STACKER

(75) Inventor: Adrian Smith, Farrell Flat (AU)

(73) Assignee: Ashmore Engineering Pty Ltd, Farrell Flat (AU)

(*) Notice: Subject to any disclaimer, the term of this patent is extended or adjusted under 35 U.S.C. 154(b) by 206 days.

(21) Appl. No.: 13/057,597

(22) PCT Filed: Aug. 6, 2009

(86) PCT No.: PCT/AU2009/001004
§ 371 (c)(1),
(2), (4) Date: Feb. 4, 2011

(87) PCT Pub. No.: WO2010/015033
PCT Pub. Date: Feb. 11, 2010

(65) Prior Publication Data
US 2011/0135431 A1 Jun. 9, 2011

(30) Foreign Application Priority Data
Aug. 6, 2008 (AU) .................... 2008904012

(51) Int. Cl.
*B60P 1/00* (2006.01)
*B60P 1/04* (2006.01)
*B65G 67/00* (2006.01)
*B65F 1/00* (2006.01)
*B21C 47/24* (2006.01)
*B62B 1/00* (2006.01)

(52) U.S. Cl.
USPC ............ 414/482; 414/111; 414/486; 414/518; 414/772; 414/776

(58) Field of Classification Search
USPC ........ 414/518, 469, 482, 486, 111, 132, 24.5, 414/24.6, 373, 397, 409, 467, 501, 522, 414/537, 552, 555, 739, 772, 773, 776, 783, 414/789.1, 789.8, 790.5, 790.6, 793.4, 414/795.2
See application file for complete search history.

(56) References Cited

U.S. PATENT DOCUMENTS

| | | | | |
|---|---|---|---|---|
| 2,693,285 A | * | 11/1954 | Buschbom | ............... 414/555 |
| 2,954,886 A | * | 10/1960 | Nelson | ............... 414/24.5 |
| 4,259,034 A | * | 3/1981 | Ward et al. | ............... 414/24.6 |
| 4,396,330 A | * | 8/1983 | Rozeboom | ............... 414/24.5 |
| 4,909,694 A | * | 3/1990 | Peters et al. | ............... 414/24.5 |
| 5,584,637 A | * | 12/1996 | Jensen, Sr. | ............... 414/24.5 |
| 5,846,046 A | | 12/1998 | Warburton | |
| 5,921,738 A | | 7/1999 | Rempel | |
| 6,171,047 B1 | * | 1/2001 | Vandervalk | ............... 414/24.5 |
| 6,312,205 B1 | * | 11/2001 | Vandenberg | ............... 414/24.5 |

(Continued)

FOREIGN PATENT DOCUMENTS

| | | | |
|---|---|---|---|
| DE | 9004981 | * | 8/1990 |
| EP | 338468 | * | 10/1989 |
| EP | 0553602 A2 | | 8/1993 |
| WO | WO03/081985 | * | 10/2003 |

*Primary Examiner* — Gregory Adams
*Assistant Examiner* — Lynn Schwenning
(74) *Attorney, Agent, or Firm* — Renner Kenner Greive Bobak Taylor & Weber

(57) ABSTRACT

An apparatus and method for stacking hay bales. The hay bale stacker includes a trailer having chassis and a platform, a hay clamping assembly (J) positioned at a longitudinal edge of the platform, the clamping assembly is pivotally coupled to the hay bale platform to selectively move between a horizontal bale clamping position and a vertical bale unloading position.

12 Claims, 10 Drawing Sheets

(56) References Cited

U.S. PATENT DOCUMENTS

| | | | |
|---|---|---|---|
| 6,364,591 B1 * | 4/2002 | Stevenson | 414/25 |
| 6,764,274 B2 * | 7/2004 | Maclay | 414/812 |
| 7,121,783 B2 * | 10/2006 | Maclay | 414/703 |
| 7,347,659 B2 * | 3/2008 | Maclay | 414/703 |

* cited by examiner

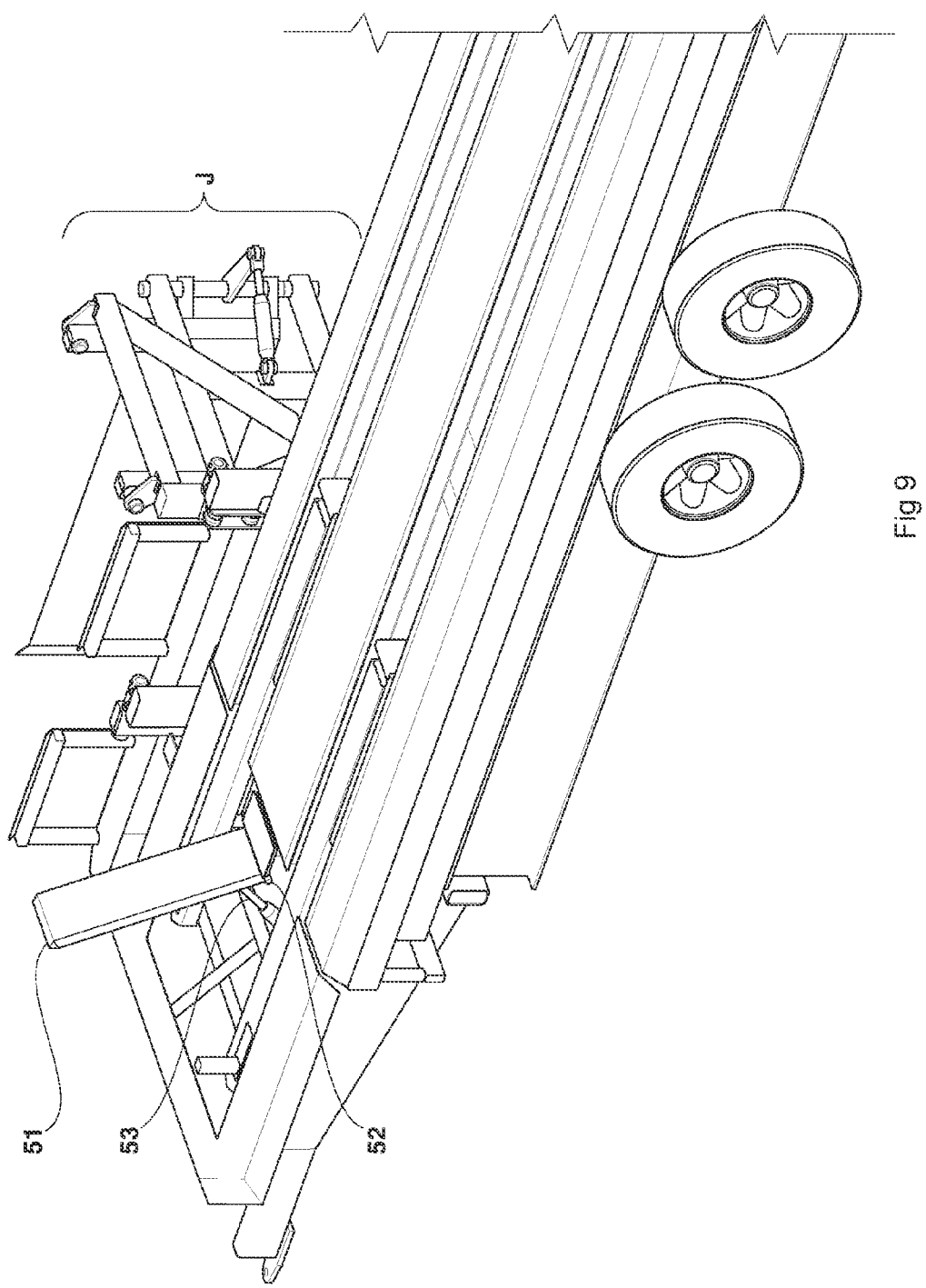

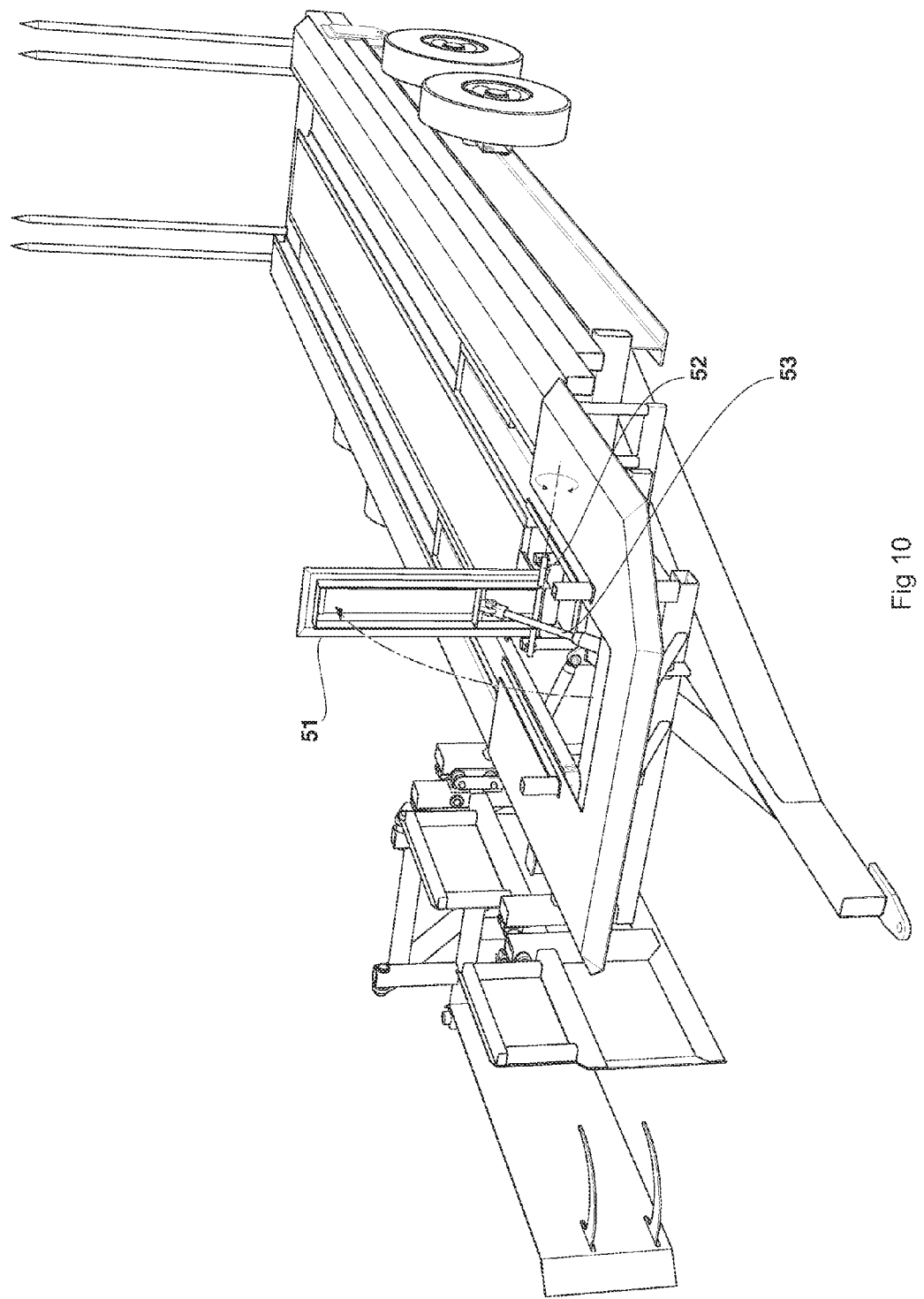

HAY BALE STACKER

FIELD OF THE INVENTION

The present invention, relates to a system and method for loading, stacking and/or handling bales of hay.

In particular, the present invention relates to a loading and stacking apparatus that includes a bale loading and moving mechanism to retrieve a bale of hay and stack it on to a bale-accumulating platform.

Hay, when harvested, is traditionally collected into a variety of shapes and sizes depending on the device employed in forming the bale. A typical bale has a regular geometry, such as a rectangle. The weight of such bales varies depending upon its size and composition; however, with modern farming techniques bales are of a considerable weight that makes their handling and transportation problematic at times.

When a bale of hay is formed they are typically deposited onto the ground and vehicles, such as wagons or trucks, are driven over the fields to where the bales are located and then lifted onto the vehicles by some lifting apparatus, such as a front end loader. When the vehicle is completely loaded with bales, the vehicle is then driven to a place where the bales are off-loaded for storage. The process of initially lifting the bales on to the vehicle or trailer with a front end loader is often cumbersome and time-consuming. The process becomes even more onerous when the bales are ferried through the field on a front end loader to a loading site rather than being loaded onto an infield truck/wagon. The latter procedure is particularly dangerous given most hay is loaded at night and vision is compromised.

To increase efficiencies in the field when loading hay, various models of Bale Stackers have been designed with differing lifting mechanisms to retrieve bales in the field and deposit directly onto the tray of the Bale Stacker. However, current models on the market retrieve the bales in such a manner that they are required to travel across the hay baling rows, or when travelling in the same direction of the hay baler, require that the bales themselves be turned on the ground prior to pick-up. This action increases the potential for contamination of the hay by forcing soil and other ground contaminants into the bale. Any level of contamination of the bale disqualifies the hay for the export market.

OBJECT OF THE INVENTION

The aim of the present invention is to provide a hay bale stacker that can follow a hay baler in the same direction, thus allowing hay bales to be retrieved as soon as they have left the baler.

Bale Stackers that travel across the row of the baler generally require that the baling process is complete (or at least substantially advanced) before the Stacking process can begin. This increases the risk of damage of the bale through increased exposure to the elements. Further, Bale Stackers that are designed to travel across the row of the Baler have difficulties when applied to Tramline Farming, Raised Bed Farming, and narrow irrigation bays.

It is a further object of the present invention to provide a hay stacker that does not require the hay bales to be turned on the ground prior to their retrieval, thus limiting the prospect of contamination.

It is an object of the present invention to overcome, or at least substantially ameliorate, the disadvantages and shortcomings of the prior art.

Other objects and advantages of the present invention will become apparent from the following description, taking in connection with the accompanying drawings, wherein, by way of illustration and example, an embodiment of the present invention is disclosed.

SUMMARY OF THE INVENTION

According to the present invention, although this should not be seen as limiting the invention in any way, there is provided a hay bale stacker that includes a trailer having chassis and a platform, a hay clamping assembly (J) positioned at a longitudinal edge of the platform, the clamping assembly characterised in that it is pivotally coupled to the hay bale platform to selectively move between a horizontal bale clamping position and a vertical bale unloading position.

The hay bale platform is further characterised in that there is at least one pivotable trolley positioned or located in a channel on the platform, for moving of bales towards a rear of the hay bale platform.

In preference, the hay bale clamping assembly includes a first and second clamping member substantially parallel to one another, said clamping members being substantially perpendicular to a ground surface.

In preference, the first clamping member is pivotally connected to the clamping assembly so as to allow the first clamping member to rotate across the second clamping member.

In preference, the hay bale clamping assembly further includes a hay bale engagement means for releasably securing a hay bale in the clamping assembly.

In preference, the hay bale engagement means is a spike.

In preference, the spike passes through the first clamping member of the hay bale engagement means.

The hay bale stacker as claimed in any one of claims 4-6, further characterised in that when the hay bale clamping assembly is in the vertical hay bale unloading position the first clamping member is located above the second clamping member and is pivotally rotatable with respect to the second clamping member so that rotation of the first clamping member moves a hay bale from the second hay bale clamping member onto the adjacent platform In one implementation of the present invention, the apparatus includes, a hay bale platform and a bale loading or clamping mechanism offset to the trailer to pick up and deposit bales of hay on the hay bale platform. The trailer may be pulled by a tractor or be self-propelled. The hay bale clamping assembly including a set of clamping members being an inner and outer plate, said clamping assembly adapted to Clamp a bale of hay, then rotate the bale of hay from a first position to a second position such that the clamping members are now substantially horizontal. The invention includes a device which operates when the inner clamping member and the outer clamping member are substantially horizontal. The device releases the oil pressure holding the clamping members together to allow the first clamping member to freely rotate across the second clamping member.

BRIEF DESCRIPTION OF THE DRAWINGS

By way of example, an employment of the invention is described more fully hereinafter with reference to the accompanying drawings, in which:

FIG. 9 shows an alternative addition to the present invention when used to stack a double layer of 8×4×3 bales;

FIG. 10 is a front view of FIG. 9.

DETAILED DESCRIPTION OF THE INVENTION

Figure 1:
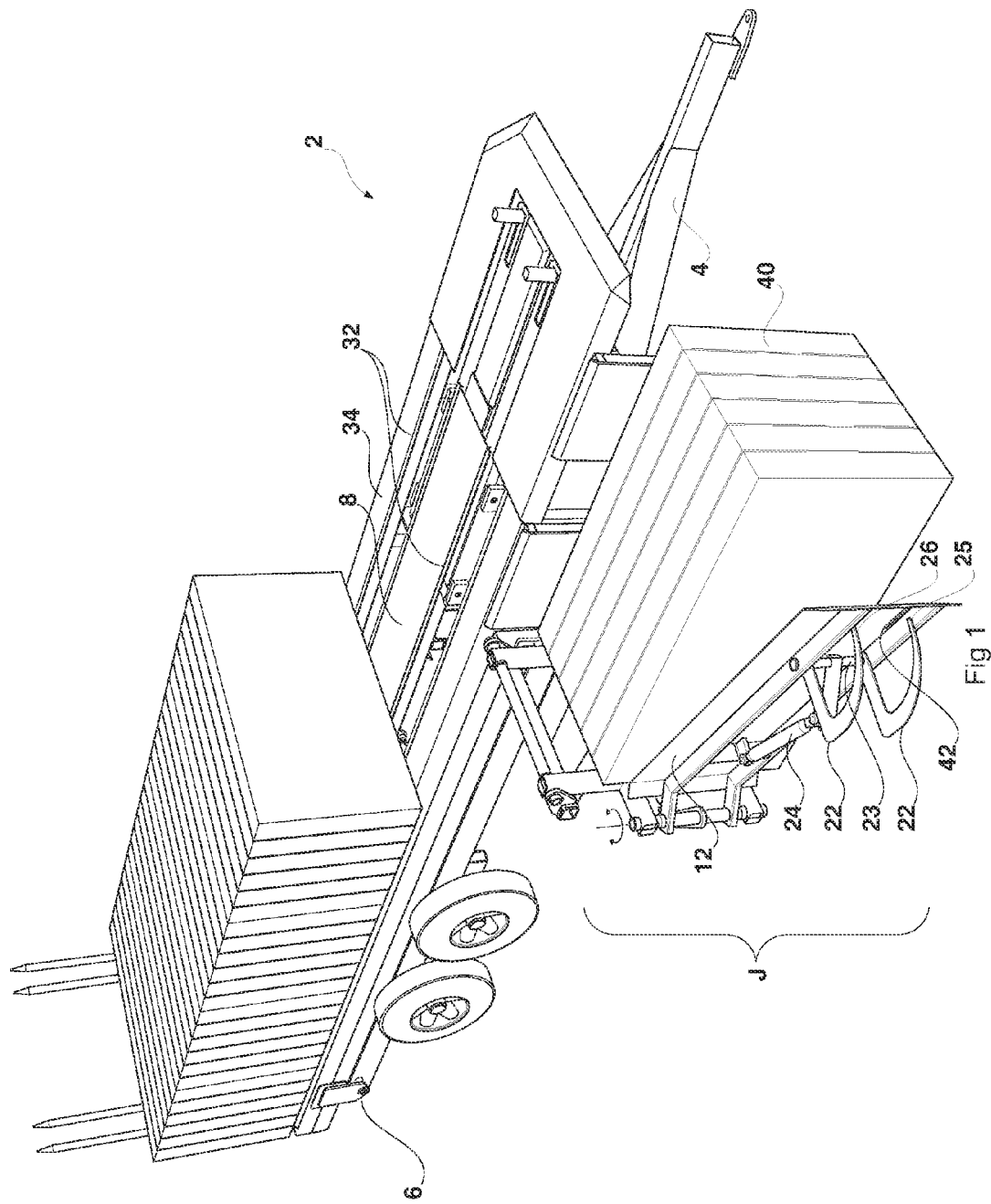
FIG. 1 is a side perspective view of the invention with the hay bale clamping assembly in an open position.

The hay bale stacker (2) includes a trailer (4) consisting of a chassis component (6) and a hay bale platform (8). The hay bale platform (8) is raised hydraulically and pivots around axis (10) with a pair of hydraulic cylinders that are interconnected to a Multi-stage cylinder mounted on the trailer (4).

The hay bale clamping assembly (J) includes a first planer clamping member (12) and a second planer clamping member (14) positioned substantially perpendicular to one another. The first clamping member (12) is pivotally connected to a rear frame section (16) via a hinge joint (18) and controlled by movement of the hydraulic cylinder (20).

The first clamping member (12) also includes a curved spike section (22) that pivots about hinge (23) by action of the hydraulic cylinder (24). The curved spike section (12) having ends (25) and (26) that are adapted to be inserted into a bale of hay so as to removably secure the hay between the clamping members.

Additionally, the frame section (16) is pivotally attached to frame member (27) about axis (28) by movement of the hydraulic cylinder (30).

Figure 2:
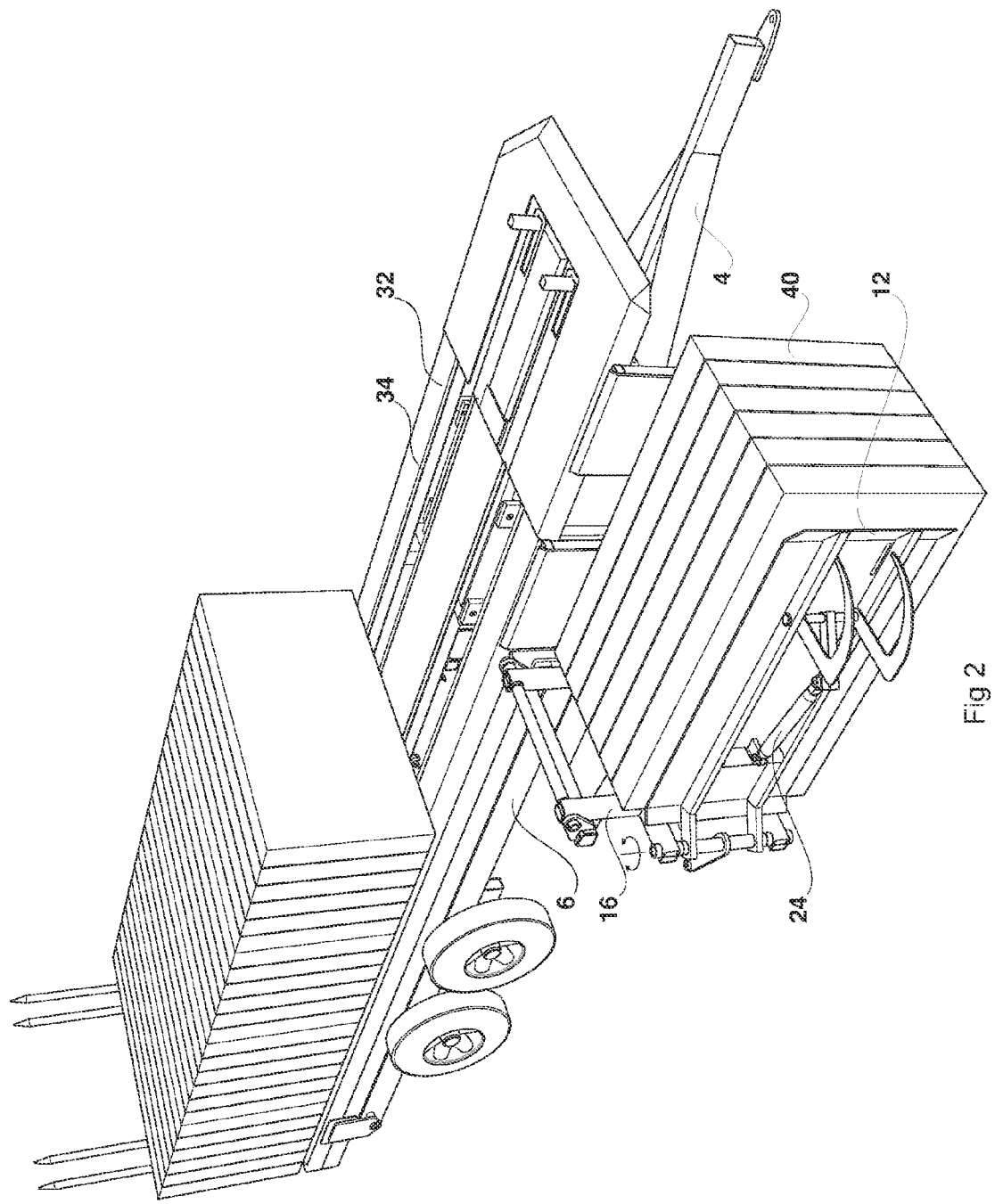
FIG. 2 is the same view as FIG. 1 with the hay bale clamping assembly in an closed position
Figure 3:
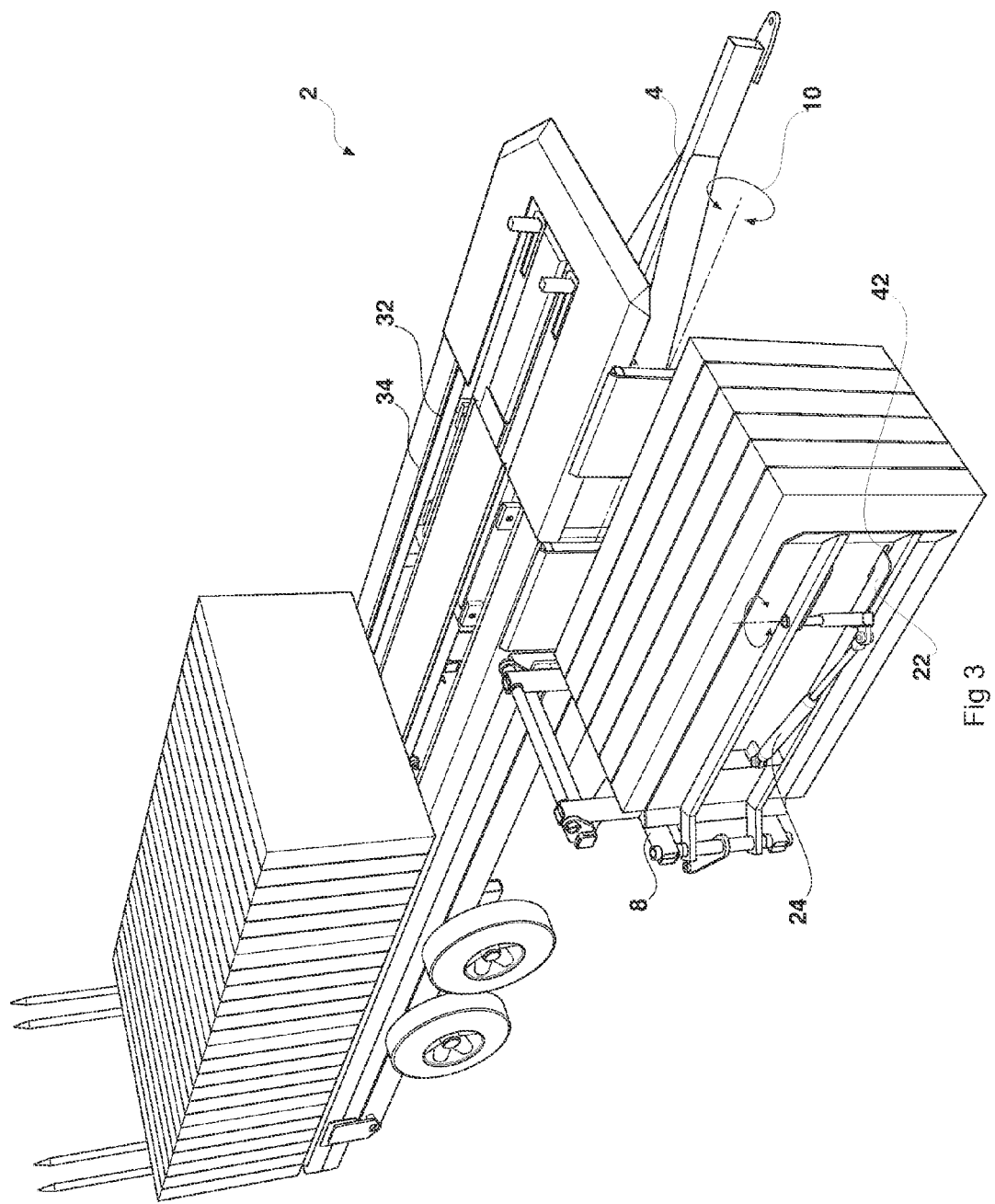
FIG. 3 is the same view as FIG. 1 with the spike sections penetrating the hay bale.
Figure 4:
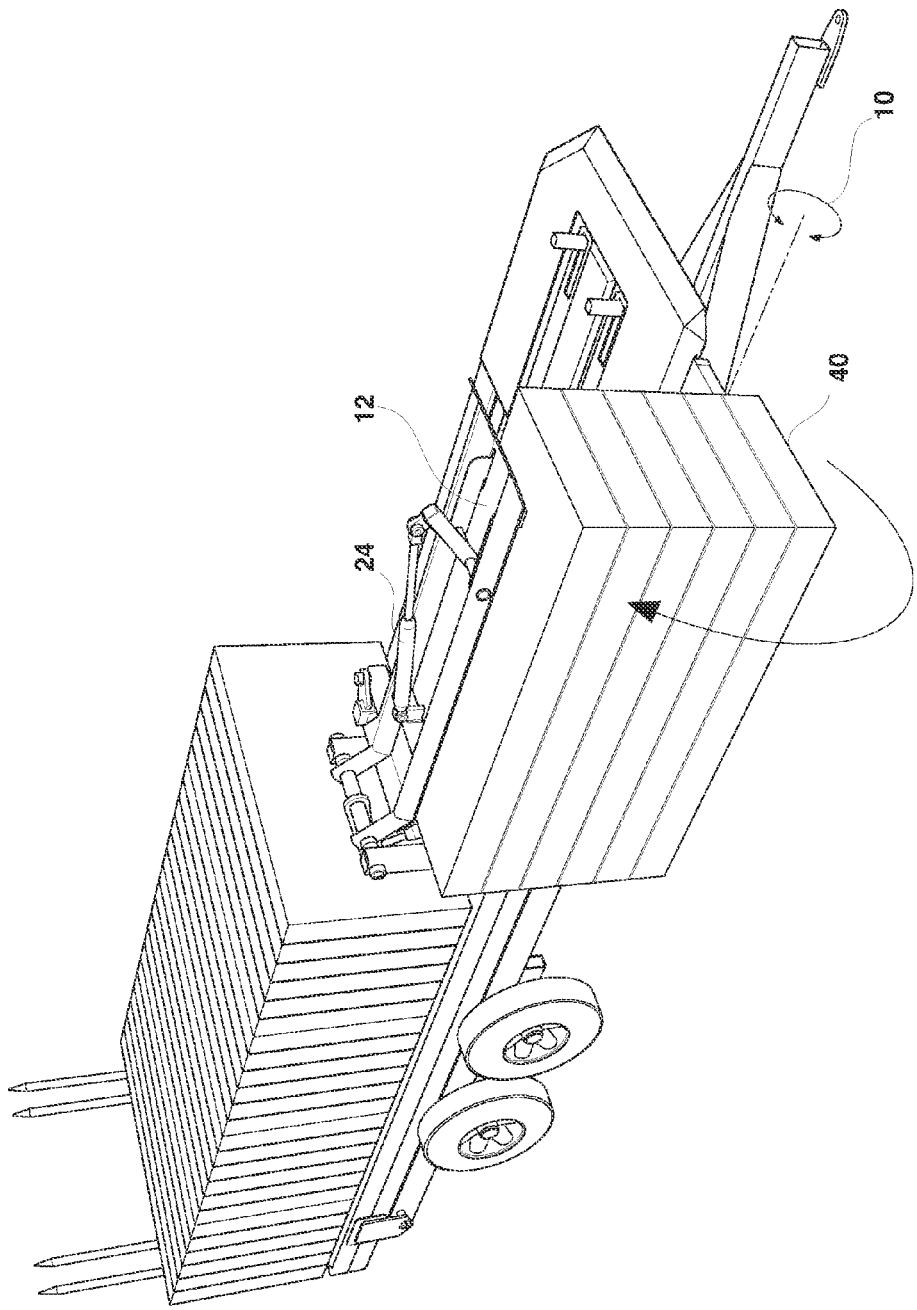
FIG. 4 is the same view as FIG. 1 with the clamped hay bale in a rotated position.
Figure 5:
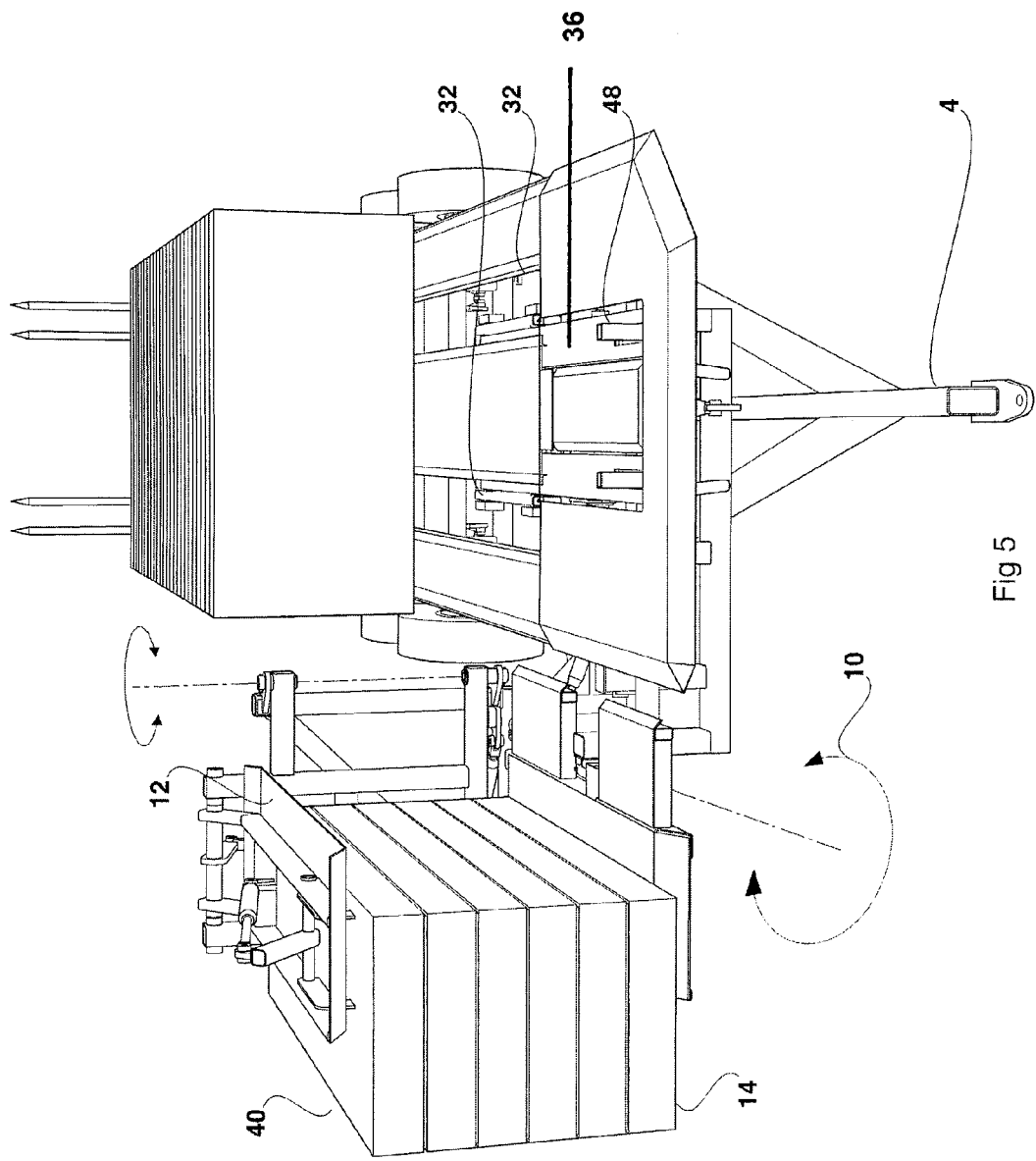
FIG. 5 is a front on view of FIG. 4.
Figure 6:
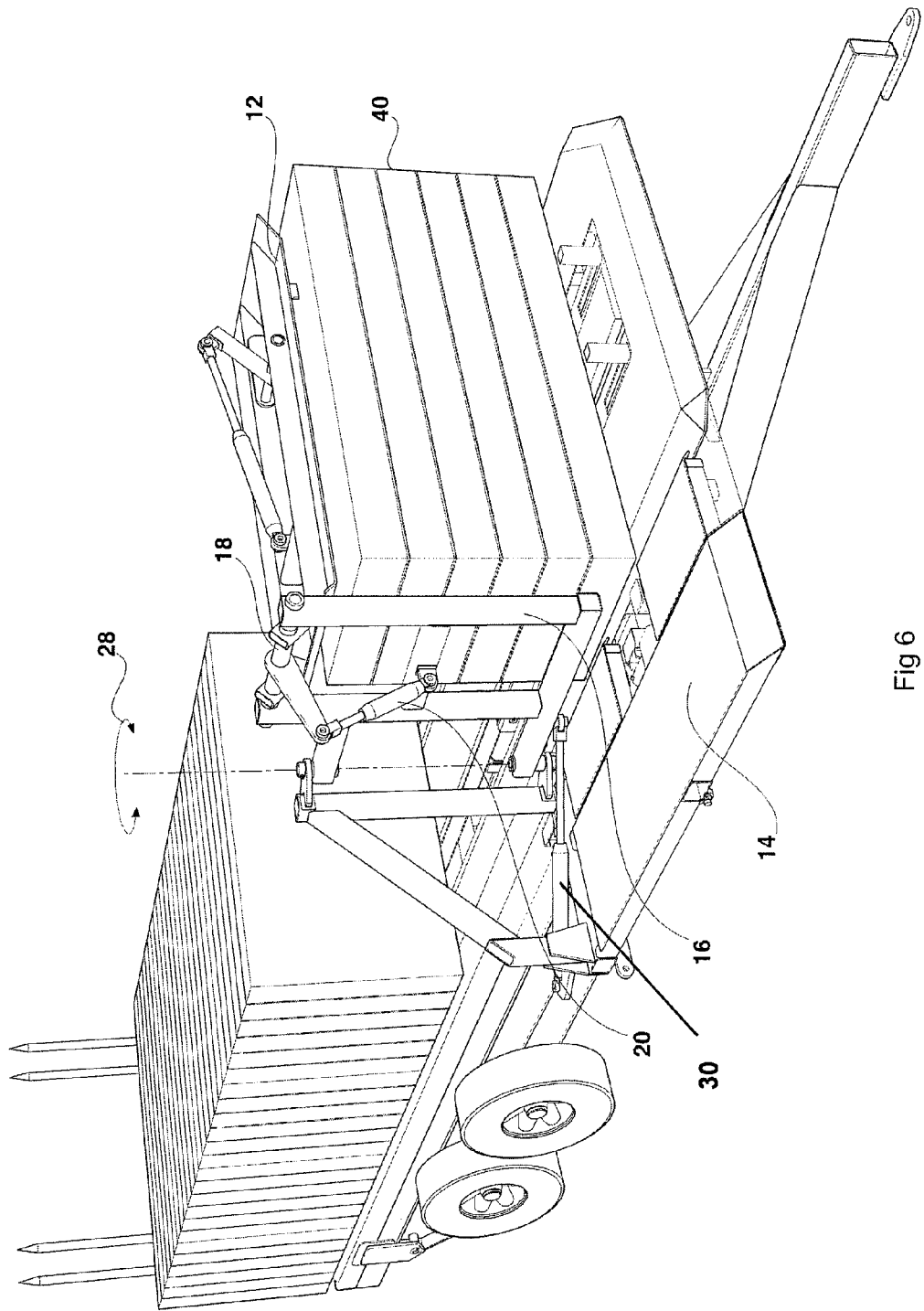
FIG. 6 shows the hale bale being rotated onto the hay bale platform.

The hay bale platform (8) is fitted with a pair of trolleys (32) running lengthways in the channels (34) within which are fitted lifting arms (36). The trolleys (32) move transversely within the channels (34) and the lifting arms (36) are capable of pivoting from the substantially horizontal position as shown in FIG. 3 to be substantially vertical position in FIG. 7 by the use of hydraulics In operation, as the hay bale stacker (2) moves forward a hay bale (40) is located and engaged between the first clamping member (12) and the second clamping member (14) of the hay bale clamping assembly in a horizontal position gathering position. When the hay bale is fully engaged and pressing against the frame section (16), the first clamping member is hydraulically rotated from its open position (as shown in FIG. 1) to an engaged position (as shown in FIG. 2) so as to clamp against the outer surfaces of the hay bale (40). The curved spike section (22) is then operated and the ends (25 & 26) pass through the slots (42) of the first clamping member and penetrate the hay bale (40) to hold it firmly in place.

Now with the bale firmly clamped and secured between the clamping members, the hay bale clamping assembly (J) is then hydraulically rotated around axis (10) so that the clamping members (12) and (14) are now substantially parallel to the platform (8). This is referred to as the vertical position as the hay bale has no been lifted from the horizontal position up off the ground. The frame section (16) is then pivoted about axis (28) by means of activation of the hydraulic cylinder (30) so that the hay bale (40) is rotated from the second clamping member (14) onto the hay bale platform (8) at a front end and across the lifting arms (36) mounted on the trolleys (32) which are in a forward (horizontal) position.

The ends (25 & 26) of the curved spike section (12) are then withdrawn from the hay bale (40) and the frame section (16) is then returned to its starting position and the clamping assembly (J) is operated in a reverse manner and lowered to receive the next bale of hay.

Trolleys (32) are then actuated to be dragged rearwards and a stop member (48) is raised to pull the bale back towards the rear of the platform. Once the hay bale (40) is in place, the lifting arms (36) are lowered and the trolleys (32) returned to their starting position. At this point, the stop members (48) are lowered to retrieve the next bale.

As now can be seen, it is possible to retrieve bales of hay from the ground and, in a relatively efficient and quick manner, place these on the trailer, the trolleys (32) being utilized to compact or compress the bales up against one another so as to efficiently stack the bales of hay.

In the manner described above, this now provides a quick and efficient way of providing a single layer of hay bales and when the hay bale stacker is full so that no more hay bales can be added to the single layer, the trolley is activated rearwards so that the stop members (48) clamp the group of hay bales onto the rear frame (49) mounted at the rear of the trailer and the hay bale platform (8) is then pivoted to a vertical position, the lifting arms (36) are activated to release the stack of hay bales and the tractor moves forward leaving behind a vertical stack of hay bales. The platform is then lowered and ready for the next cycle.

In addition to creating a single hay bale layer on the hay bale platform (8), the present invention is also capable of forming a two hay bale layer.

Figure 7:
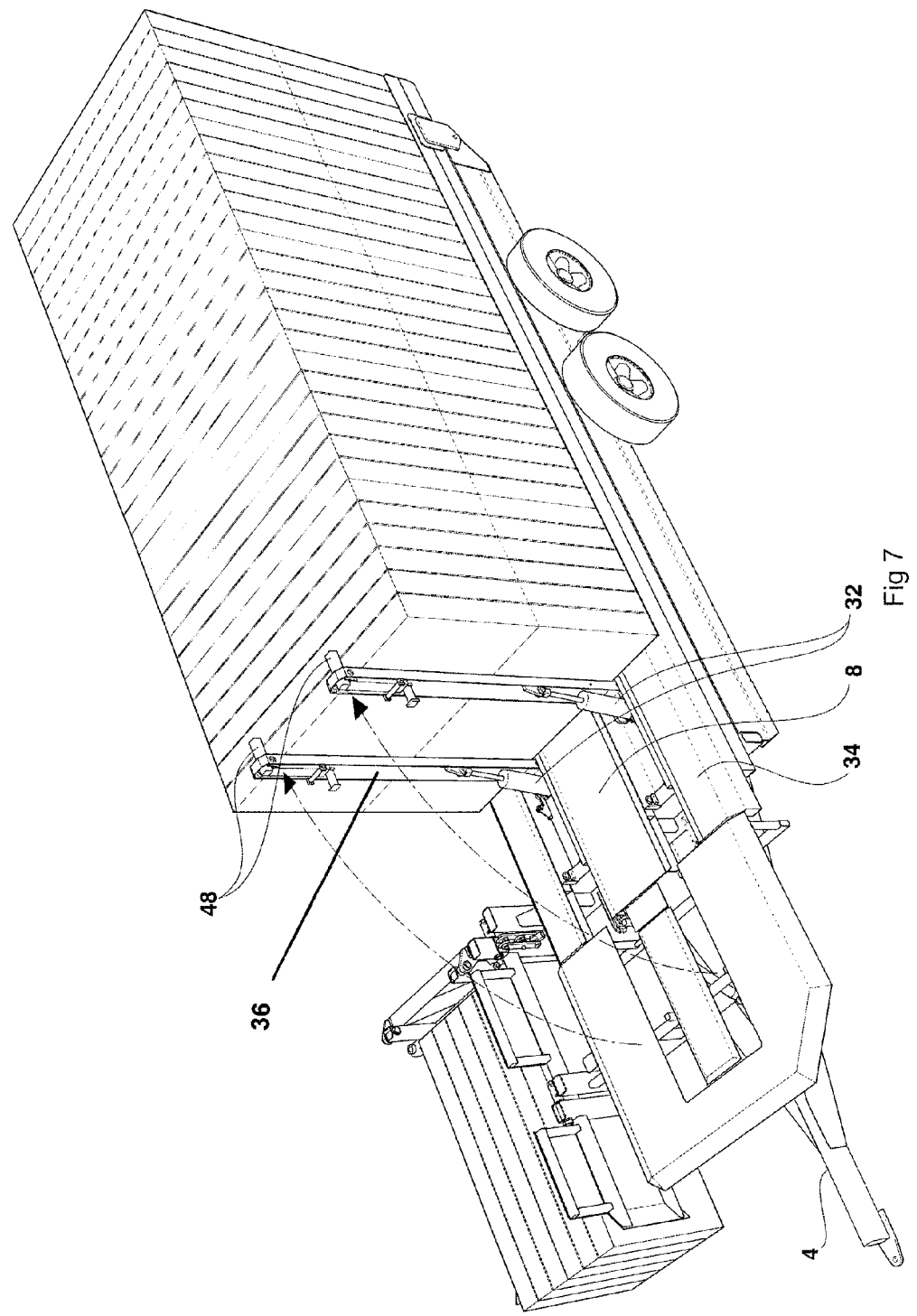
FIG. 7 shows a two layer stack of collected hay bales.
Figure 8:
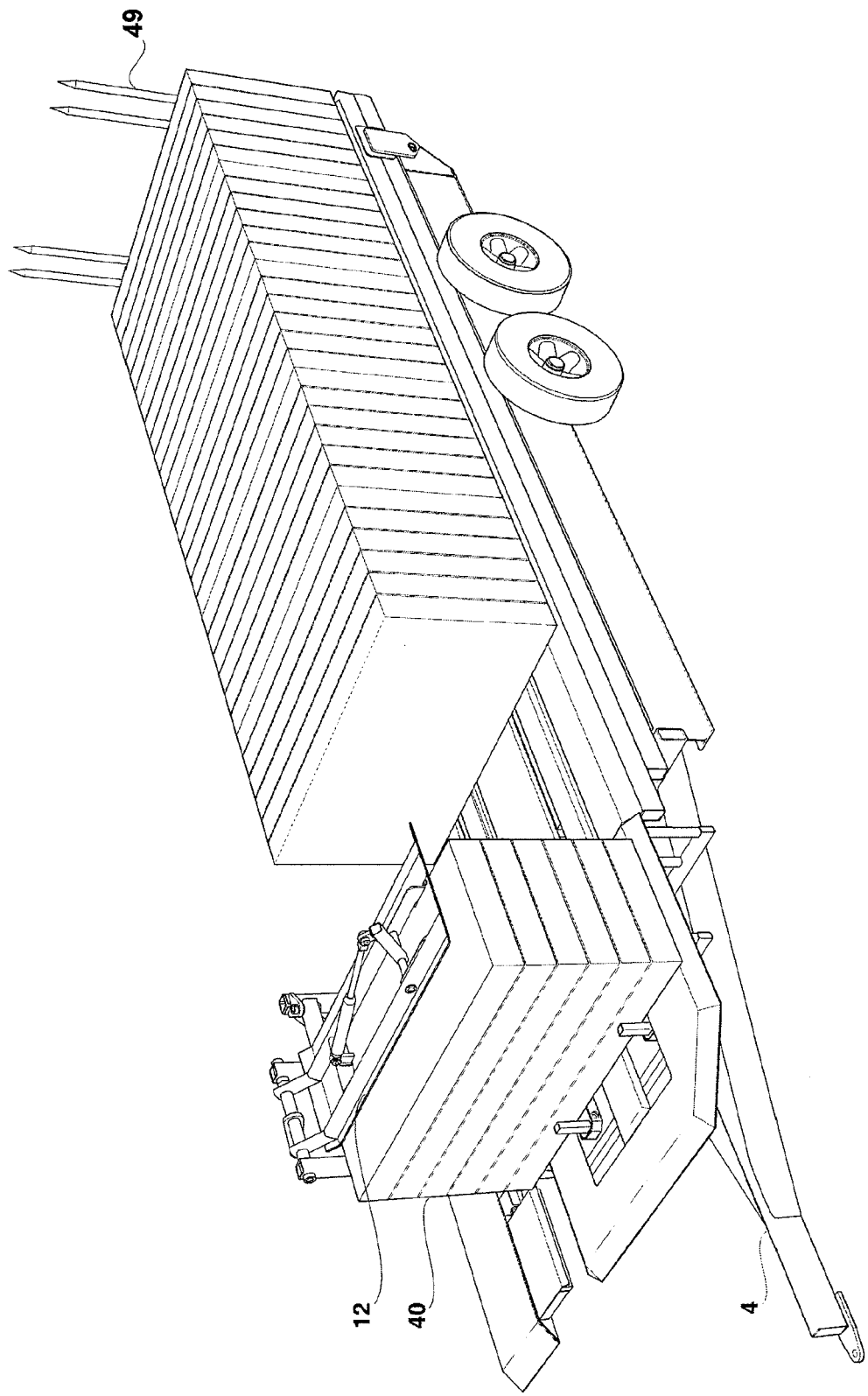
FIG. 8 shows a single layer stack of collected hay bales.

When a pair of hay bales has been lifted onto the hay bale platform (8), the trolleys (32) are moved rearward so that the bale stop members (48) drag the pair of bales rearward. At a pre-determined point, a set distance from the rear frame (49), the lifting arms (36) are actuated to pivot upwards (as shown in FIG. 7) so as to raise one bale on top of the other by tilting the two bales from the horizontal to a vertical stacked position. This process is repeated with each pair of hay bales loaded onto the hay bale platform (8) until the platform is full.

As previous, the hay bale platform (8) can then be raised so that the two rows of hay bales now stand vertically in a field and the stacker (2) can then move forward, Should the hay bales attempt to move with the stacker (2) then a push bar can be activated to in effect push the machine away from the hay bale stack.

Alternatively, the bales can be loaded onto platform (8) as previously described. The rear frame (49) is removed. At the desired off-loading location the trolley's (32) are activated rearwards. The bales slide off the rear of the platform (8) onto the ground in single file (in lieu of being stacked atop of one another). This system is used when individual bale contents need to be tested.

In addition to the above, hay balers can be set to deposit the bales 'on the string' or 'off the string' (ie the bale can be rotated 90° as it leaves the baler to be deposited 'off the string'). This rotation of the bale is required so that it presents in such a way in the field that the bale can be immediately lifted by a front end loader and placed on truck transport with the string positioned according to standard transportation procedures (orientated horizontally 'around' the bale and not 'beneath' the bale).

When bales are stacked, 8×4×4 square bales are normally stacked 'off the string' (ie the string is orientated horizontally around the bale). However, with 8×4×3 square bales they are normally stacked on the wider base of the bale for stability (ie 'on the string). When making a single layer on the bale stacker of 8×4×3 square bales, the procedures for stacking a single layer as described above will be sufficient to ensure that the bales are stacked on the wider base for stability (ie 'on the string').

However, if it is intended to stack a double layer of 8×4×3 bales, when the lifting arms (36) are pivoted as demonstrated in FIG. 7, the 8×4×3 square bales will effectively be rotated 90° to result in their placement on their wide side on the lifting platform. Consequently, when they are further rotated 90° when deposited off the stacker, a stack will result where the 8×4×3 square bales are on their narrow width and 'off the string' (ie resulting in an unstable stack).

To address this problem, additional functionality is required in the bale stacker to effect an additional 90° rotation within the stacking process when a double hay bale layer of 8×4×3 bales is intended. This additional rotation ensures that a double hay bale layer of 8×4×3 bales will be stacked on their wide side for stability (ie 'on the strings).

To achieve this, the bale stacker is designed with a door (51) fitted between the lift arms (36) on the fixed front platform. The door (51) is hinged at point (52) and lifted from the normal horizontal plane to an angled plane by a hydraulic cylinder (53) attached between the bottom of door (51) and the centre member of the drawbar assembly. When a bale is orientated across platform (8) and the hay clamping assembly (J) has returned to its first position in the lifting cycle, the door (51) is activated to raise to an angled plane, thus tipping the 8×4×3 bale 90° in a rearward direction. The bale is then dragged down the lifting platform (on its wide side) by stop member (48) attached to lift arms (36), and then handled as previously described.

As can now be appreciated, the present invention describes an apparatus and method of retrieving and stacking bales of hay in a manner that allows the stacker to follow the hay baler in the same direction so as to allow bales to be retrieved as soon as they have left the hay baler.

The embodiments of the present invention embrace systems, methods and apparatus for loading, stacking and/or the handling of large bales of hay. Those skilled in this particular art will appreciate that certain embodiments of the present invention embrace a variety of system and apparatus configurations to perform the methods that are disclosed herein.

The invention claimed is:

1. A hay bale stacker apparatus including a trailer having a chassis and a hay storage platform, a hay bale clamping assembly positioned at a longitudinal edge of the platform, the hay bale clamping assembly being pivotally coupled to the platform to selectively move between a horizontal hay bale gathering clamping position and a vertical hay bale unloading position, characterized in that the hay bale clamping assembly is offset with respect to the platform, and the hay bale clamping assembly includes a first clamping member and a second clamping member substantially parallel to one another, said clamping members being substantially perpendicular to a ground surface in a hay bale gathering position, wherein, when the hay bale clamping assembly is in the vertical hay bale unloading position, the first clamping member is located above the second clamping member and is pivotally rotatable with respect to the second clamping member so that rotation of the first clamping member moves the hay bale off the second hay bale clamping member onto the adjacent platform, and wherein the first and second clamping members are substantially planar.

2. The hay bale stacker as claimed in claim 1, further characterised in that the hay bale clamping assembly further includes a hay bale engagement means for releasably securing a hay bale in the clamping assembly.

3. The hay bale stacker as claimed in claim 2, further characterised in that hay bale engagement means is a spike.

4. The hay bale stacker as claimed in claim 3, further characterised in that the spike passes through the first clamping member of the hay bale engagement means.

5. The hay bale stacker as claimed in claim 1, further characterised in that there is at least one pivotal trolley positioned in a channel on the platform, the trolley for the moving of bales positioned on the platform towards a rear of the hay bale platform.

6. The hay bale stacker as claimed in claim 1, further characterized in that the hay bale clamping assembly has a rear frame section that contacts a rear of the hay bale and pivots along with the first clamping member.

7. The hay bale stacker as claimed in claim 3, further characterised in that when the hay bale clamping assembly is in the vertical hay bale unloading position the first clamping member is located above the second clamping member and is pivotally rotatable with respect to the second clamping member so that rotation of the first clamping member moves the hay bale off the second hay bale clamping member onto the adjacent platform.

8. The hay bale stacker as claimed in claim 4, further characterised in that when the hay bale clamping assembly is in the vertical hay bale unloading position the first clamping member is located above the second clamping member and is pivotally rotatable with respect to the second clamping member so that rotation of the first clamping member moves the hay bale off the second hay bale clamping member onto the adjacent platform.

9. The hay bale stacker as claimed in claim 8, further characterised in that there is at least one pivotal trolley positioned in a channel on the platform, the trolley for the moving of bales positioned on the platform towards a rear of the hay bale, platform.

10. A method of handling hay bales, the method including the steps of:
  a. a hay bale clamping assembly receiving a hay bale in a hay bale gathering clamping position offset to a hale bale receiving platform, the hay bale clamping assembly including first and second hay bale clamping members;
  b. clamping the hay bale in the hay bale clamping assembly;
  c. lifting and rotating the hay bale clamping assembly and the clamped hay bale 90 so that the hay bale clamping assembly is in a vertical hay bale unloading position;
  d. rotating a first clamping member of the hay bale clamping assembly to move the hay bale from the hay bale clamping assembly to the hay bale platform.
  e. repeating steps b., c., and d. to move a second hay bale to the hay bale platform to provide a pair of hay bales on the hay bale platform;
  f. directing the hay bale to a rear of the hay bale platform by movement of at least one hay bale moving member positioned on the hay bale platform, wherein the at least one hay bale moving member is a sliding mechanism having a hay bale stop member for engaging an edge of the hay bale to direct it to a rear of the hay bale platform, and
  g. pivoting the hay bale moving member about an axis to raise one hay bale of the pair of hay bales on top of the other and thereby create a vertical stack of hay bales on the hay bale platform.

11. A hay bale stacker apparatus including a trailer having a chassis and a hay storage platform, a hay bale clamping assembly that includes a first clamping member and a second clamping member, the hay bale clamping assembly positioned at a longitudinal edge of the platform, the hay bale clamping assembly being pivotably coupled to the platform to selectively move between a horizontal hay bale gathering clamping position and a vertical hay bale unloading position, characterized in that the hay bale clamping assembly is offset with respect to the platform, and further characterised in that when the hay bale clamping assembly is in the vertical hay bale unloading position the first clamping member is located above the second clamping member and is pivotally rotatable with respect to the second clamping member so that rotation of the first clamping member moves the hay bale off the second hay bale clamping member onto the adjacent platform.

12. A hay bale stacker apparatus including a trailer having a chassis and a hay storage platform, a hay bale clamping assembly positioned at a longitudinal edge of the platform, the hay bale clamping assembly being pivotally coupled to the platform to selectively move between a horizontal hay bale gathering clamping position and a vertical hay bale unloading position, characterized in that the hay bale clamping assembly is offset with respect to the platform, further characterized in that there is at least one pivotal trolley positioned in a channel on the platform, the trolley for the moving of bales positioned on the platform towards a rear of the hay bale platform, and the hay bale clamping assembly has a rear frame section that contacts a rear of the hay bale and pivots along with the first clamping member.

* * * * *